UNITED STATES PATENT OFFICE.

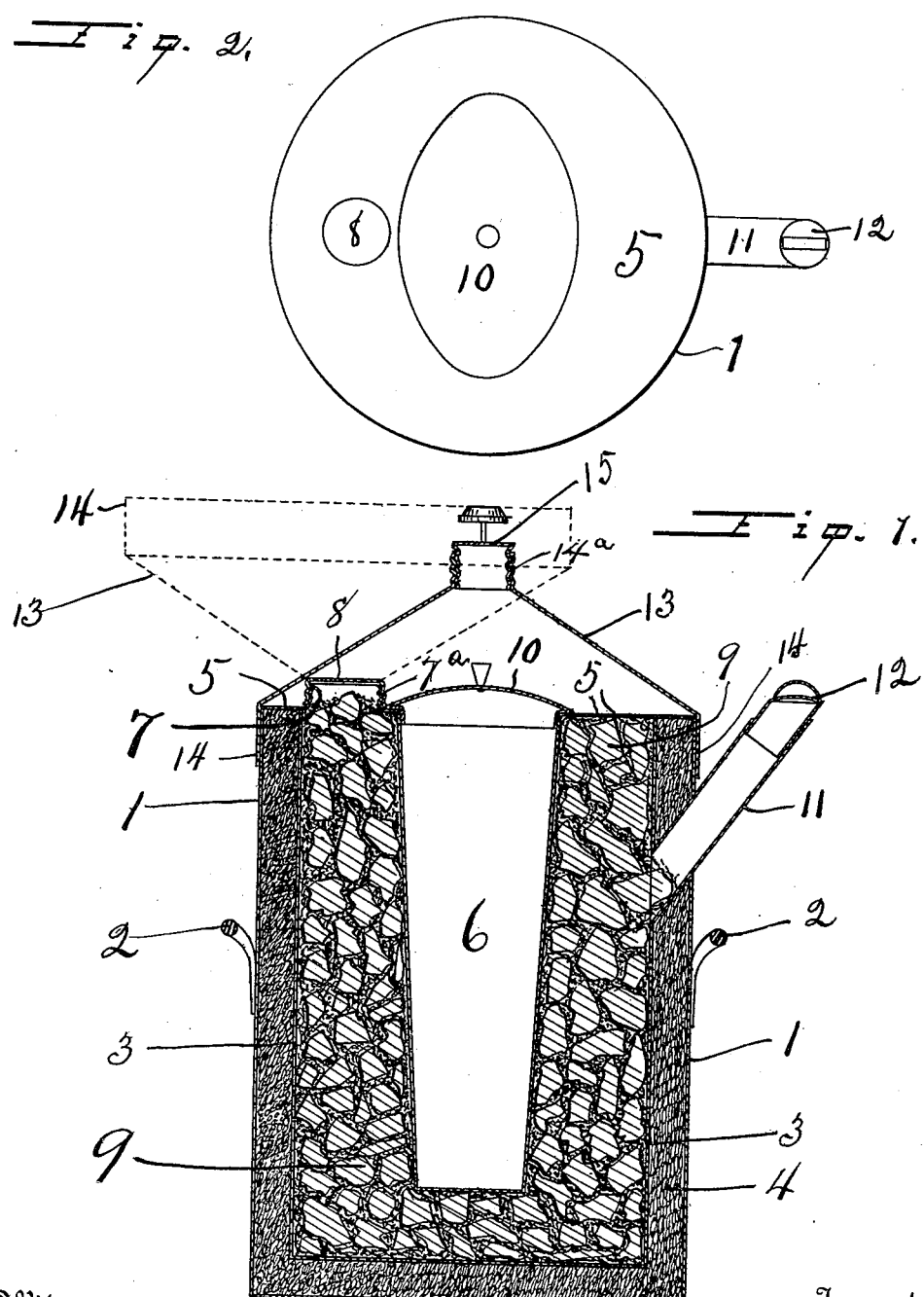

ELLSWORTH D. MIDDLEKAUFF, OF SAN FRANCISCO, CALIFORNIA, ASSIGNOR TO WILLIAM D. BOWEN, OF FRESNO, CALIFORNIA.

ICE-CREAM FREEZER.

SPECIFICATION forming part of Letters Patent No. 622,248, dated April 4, 1899.

Application filed February 8, 1898. Serial No. 669,610. (No model.)

*To all whom it may concern:*

Be it known that I, ELLSWORTH D. MIDDLEKAUFF, a citizen of the United States, residing in the city and county of San Francisco and State of California, have invented certain new and useful Improvements in Ice-Cream Freezers; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to that class of refrigerators known as "ice-cream freezers;" and my object is to furnish an apparatus which will freeze prepared cream or other articles expeditiously and economically and maintain the same in a frigid condition for a great length of time.

My invention consists in the peculiar construction, novel combination, and adaptation of parts hereinafter described, and specifically pointed out in the claim hereunto annexed, reference being had to the accompanying drawings, in which—

Figure 1 is a vertical sectional view of my improved ice-cream freezer. Fig. 2 is a top view of the same with the cover removed.

Similar figures of reference indicate corresponding parts in both views.

I employ a circular vessel 1, of suitable height and diameter, to which suitable handles 2 are attached on either side. A similarly-formed vessel 3 of smaller dimensions is placed within the said vessel 1, leaving a small space of about two inches or more between the vessels 1 and 3, which space is filled with flaxseed-hulls 4, and the said space is sealed air-tight by the top 5, which has an opening in the center thereof, into which a cream-receptacle 6 is inserted and has its top edge rigidly attached thereto, the joint thereof being rendered air-tight. The said top 5 has an opening 7 in the same at one side of the receptacle 6, and such opening is provided with a threaded collar $7^a$ and a cover 8, which fits tightly over the same.

The space between the walls of the vessel 3 and receptacle 6 is filled with ice and rock-salt 9 or other cooling agent for the purpose of reducing the temperature in the receptacle 6 to and below freezing-point. The said receptacle 6 is provided with a cover 10. In one side of the freezer a spout 11 is provided, which communicates with the ice-chamber, and such spout 11 is provided with a cover 12. A funnel-shaped cover 13, having upright flanges 14 on its lower edge, is inserted over the top of the vessel 1. The apex of said cover 13 is provided with an opening surrounded by a threaded collar $14^a$, in which a cover 15 is closely fitted. In filling the ice-chamber with the ice and salt aforesaid the cover 13 is removed, inverted, and its collar $14^a$ inserted in the opening 7, thus forming a funnel for that purpose.

The office of the space between the vessels 1 and 3, which is filled with the flaxseed-hulls 4, is to furnish a dead-air space, which is rendered more adaptable for refrigeration by reason of the flaxseed-hulls 4.

Another advantage of my improved refrigerator is that when the covers 8 and 12 are in position the ice-chamber is hermetically sealed, thus rendering liability to action from the surrounding atmosphere very slight, and when the cover 13 is in position the same is doubly sealed, and consequently less liable to the action of the heated atmosphere without.

The mode of operating my improved ice-cream freezer is as follows: The flaxseed-hulls 4 are introduced into the space between the vessels 1 and 3 when the refrigerator is in course of construction and are preserved in normal condition by the oil which they contain. When the top 5 is put into position, the said space is sealed water and air tight. When it is desired to freeze cream or other material, the cover 12 is placed in position and the covers 13 and 8, respectively, are removed, and the cover 15 having been taken from the said cover 13 the same is inverted, as indicated by dotted lines, and placed in position in the opening 7, whereupon the ice and salt 9, having been prepared, are introduced into the vessel 3. The cover 13 is then removed and the cover 8 placed into position over the opening 7. The material to be operated upon is placed in the vessel 6 and the cover 10 placed in position thereon. The covers 13 and 15 are placed in their respective positions, whereupon the temperature of the vessel 6 and its contents will be greatly reduced. As the ice and salt 9 melt, the liquid may be withdrawn by way of the spout 11.

I am aware that ice-cream freezers have been constructed which are provided with a vessel adapted to receive the cream and have ice and salt packed around the same, and therefore that feature I do not claim broadly; but What I do claim as new, and desire to secure by Letters Patent, is—

The herein-described ice-cream freezer consisting essentially of the inner and outer vessels 3 and 1 having a suitable filling between them, the central cream-receptacle 6, the annular top 5 permanently connecting the upper ends of the vessels 1 and 3 and receptacle 6 and having a filling-opening communicating with the space between the vessel 3 and the receptacle 6 and a removable cover 8 for said opening, the fixed drain-spout 11 extending through the space between the shells 1 and 3 and communicating with the space between the shell 3 and receptacle 6 and having a removable cover, the removable cover 10 on the cream-receptacle, and the removable funnel-shaped cover inclosing the covers 8 and 10 and having the marginal flange 14 surrounding the outer shell 1 and also having the opening in its apex surrounded by a collar, and a removable cover for said opening; the said funnel-shaped cover being adapted to be inverted and used as a funnel in filling the space between the vessel 3 and receptacle 6 with ice, substantially as specified.

In testimony whereof I affix my signature in presence of two witnesses.

ELLSWORTH D. MIDDLEKAUFF.

Witnesses:
JAMES T. SUMMERVILLE,
MOLBRY HAYNES.